US008169868B2

(12) United States Patent
Ishihara

(10) Patent No.: US 8,169,868 B2
(45) Date of Patent: May 1, 2012

(54) METHOD FOR DETECTING SURFACE DEFECTS IN PATTERNED MEDIA

(75) Inventor: Ayumu Ishihara, Kamisato (JP)

(73) Assignee: Hitachi High-Technologies Corporation, Tokyo (JP)

( * ) Notice: Subject to any disclaimer, the term of this patent is extended or adjusted under 35 U.S.C. 154(b) by 3 days.

(21) Appl. No.: 12/715,891

(22) Filed: Mar. 2, 2010

(65) Prior Publication Data

US 2010/0246357 A1 Sep. 30, 2010

(30) Foreign Application Priority Data

Mar. 26, 2009 (JP) ................................. 2009-076230

(51) Int. Cl.
*G11B 20/18* (2006.01)
(52) U.S. Cl. ............... 369/53.42; 369/44.32; 369/47.44; 369/47.14; 369/53.12; 369/53.15; 369/53.17
(58) Field of Classification Search ............... 369/53.41, 369/53.42, 44.32, 47.44, 53.12, 53.15, 53.17, 369/47.14
See application file for complete search history.

(56) References Cited

U.S. PATENT DOCUMENTS 4,297,737 A * 10/1981 Andresen et al. ............. 360/135
4,395,122 A * 7/1983 Southgate et al. ......... 356/237.5
5,820,769 A 10/1998 Chou
2002/0027854 A1 * 3/2002 Nakane et al. ............. 369/53.17
2005/0219973 A1 * 10/2005 Jin et al. ..................... 369/47.14

FOREIGN PATENT DOCUMENTS

JP 2002-148207 5/2002

OTHER PUBLICATIONS

Machine translation of Jp 2002148207 by Kikuchi hiroto on May 22, 2002.*

* cited by examiner

*Primary Examiner* — Wayne Young
*Assistant Examiner* — Linh Nguyen
(74) *Attorney, Agent, or Firm* — Brundidge & Stanger, P.C.

(57) ABSTRACT

An optical defect detection method for patterned media includes: irradiating a laser beam onto a patterned medium and obtaining reflected light by reflection very close to a sample; outputting the reflected light as an analog electrical signal from an optical receiver; converting the analog signal to a digital signal; obtaining a surface profile in a track direction by sampling the analog signal; obtaining a servo area profile by setting a slice for detecting servo area; calculating an average value in a track width direction based on plural servo area profiles; generating a master servo area profile based on the average value; obtaining a difference between the master servo area profile and the specific servo area profile; and detecting the presence of a defect including surface roughness, process fluctuation, and adhesion of foreign matters, from a differential waveform.

13 Claims, 7 Drawing Sheets

METHOD FOR DETECTING SURFACE DEFECTS IN PATTERNED MEDIA

FIELD OF THE INVENTION

The present invention relates to a defect inspection method for inspecting the presence or absence of defects including surface roughness, process fluctuation, or adhesion of foreign matters in a magnetic recording medium used for a magnetic disk device. More specifically, the present invention relates to a method for detecting surface defects in patterned media formed by applying imprint lithography techniques.

BACKGROUND OF THE INVENTION

Higher recording density of magnetic recording media can be achieved by reducing the recording bit length. However, such a reduction in the bit size leads to the problem of data erasure of adjacent tracks in data writing, as well as the problem of S/N degradation of the reproduced signal due to leakage magnetic field from adjacent tracks in data reading. In order to alleviate the influence of adjacent tracks, there have been developed the so-called discrete track media in which a gap is formed each between adjacent tracks, as well as the so-called patterned media in which a gap is formed both between adjacent tracks and between adjacent bits (see U.S. Pat. No. 5,820,769).

An example of the method for inspecting patterned media is a glide test for detecting defects by flying an actual magnetic head over a medium. Another example is an optical test for detecting defects by means of reflected light from a laser.

The glide test uses a dedicated head with a small flying height to scan a medium, causing the head to physically collide with a protrusion defect, and detecting the collision as an electrical signal. This method can detect convex-shaped defects both in data and servo areas, but is not suitable for detecting concave-shaped defects. In addition, the detection time is increased when the entire surface of the medium is scanned by the head.

For the optical test, JP-Publication No. 2002-148207 discloses a method for irradiating a laser beam with a larger spot than the track pitch onto a surface of a medium, and detecting the presence or absence of defects including surface roughness and adhesion of foreign matters, based on the polarization of the reflected light of the laser beam.

The method described in JP-Publication No. 2002-148207 can detect the defect while reducing the influence of the gap formed in the data area of a discrete track medium. However, the laser beam greatly reacts with the servo area pattern physically formed in the discrete track medium as if there were a significant defect, resulting in misinformation. Further, it is difficult to determine the defect based on a certain threshold when the profile shape, which is obtained by the reflected light from the servo area, changes in the radius direction.

SUMMARY OF THE INVENTION

The present invention solves the above problems by providing an inspection method for inspecting the concave/convex shape of discrete media and pattern media, at high speed by an optical laser in order to detect foreign matters or defects.

Thus it is desirable to provide a method for detecting surface defects of patterned media. The method includes the following steps: irradiating a laser beam onto a surface of a rotating patterned medium; detecting reflected light from the surface of the patterned medium by an optical receiver, and converting the reflected light to an analog electrical signal; converting the analog electrical signal to a digital signal by an analog/digital converter; distinguishing between a data area and a servo area based on a profile obtained by sampling the digital signal; determining the presence or absence of a defect by a predetermined threshold with respect to the distinguished data area; obtaining a differential waveform by taking a difference between the profile of the distinguished data servo area and a master servo area profile prepared in advance; and determining the presence or absence of a defect based on a predetermined threshold with respect to the obtained differential waveform.

It is preferable that the master servo area profile is a profile obtained from an average value over plural servo areas of the patterned medium.

Further, it is possible that the master servo area profile is a profile obtained from an average value over servo areas on one track of the patterned medium.

Further, it is also possible that the master servo area profile is a profile obtained from an average value over plural servo areas, which is obtained by dividing the patterned medium into an outer peripheral area, a middle peripheral area, and an inner peripheral area.

The reflected light from the surface of the patterned medium can be diffuse light or specular light.

According to the present invention, it is possible to detect a concave/convex defect in a servo area by taking the difference between the appropriate master servo area profile and the profile of the reflected light that changes depending on the shape and pattern of the servo area.

DETAILED DESCRIPTION OF THE PREFERRED EMBODIMENTS

First, a brief description will be given of the structure and production method of patterned media, such as discrete media and pattern media, according to the present invention.

Figure 1:
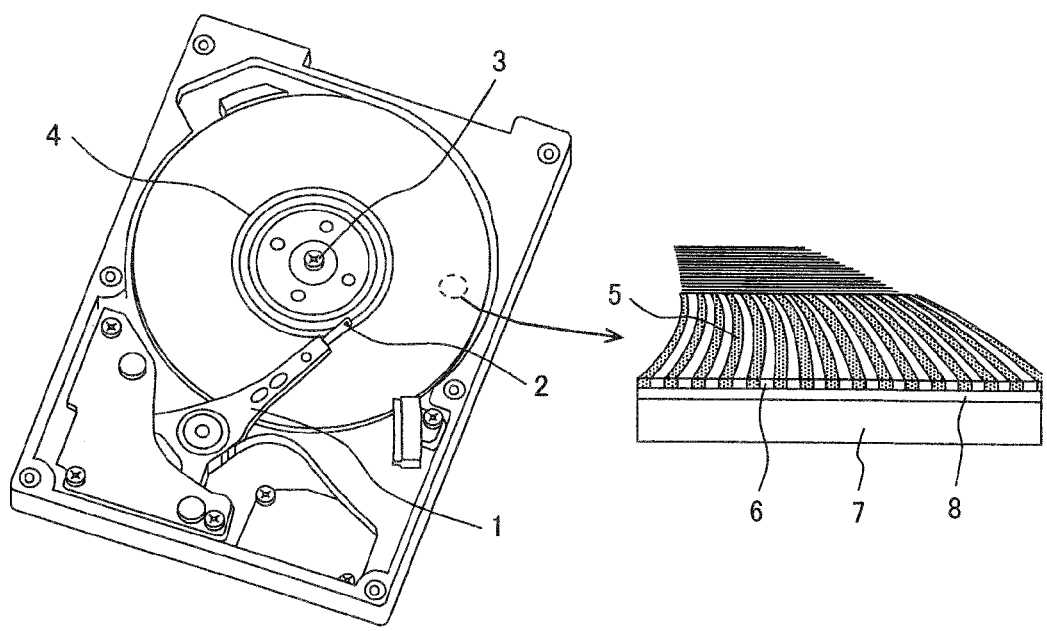
FIG. 1 is a schematic diagram of a magnetic disk device and a discrete track medium, according to the present invention.

FIG. 1 shows a schematic configuration of a magnetic disk device, and a schematic configuration of a discrete track medium. The magnetic disk device includes a spindle motor 3, a magnetic disk (discrete track medium) 4 that is fixed to the spindle motor 3, and a magnetic head 2 supported by a swing arm 1 to read/write information with respect to the magnetic disk 4. The magnetic disk 4 is processed in such a way that a soft magnetic layer 8 is formed on a glass substrate 7 together with a discrete track medium and a pattern medium, so that a magnetic layer 5 to be a recoding layer on the soft magnetic layer 8 has a concave-convex shape.

Figure 2A:
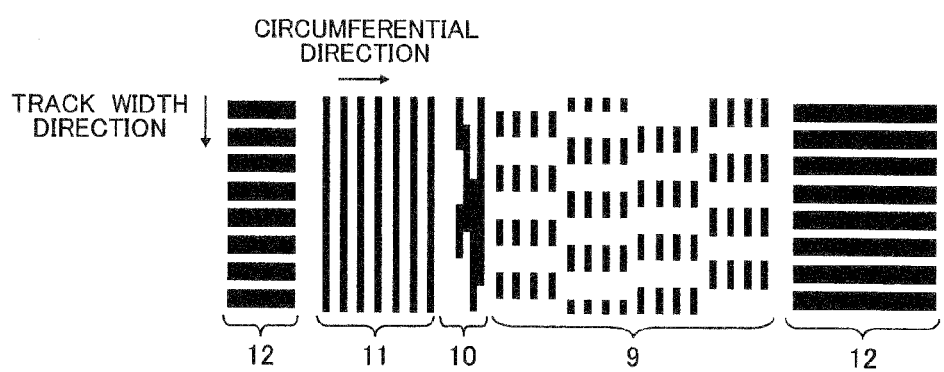
FIGS. 2A and 2B are top views of the configuration of servo areas of patterned media.
Figure 2B:
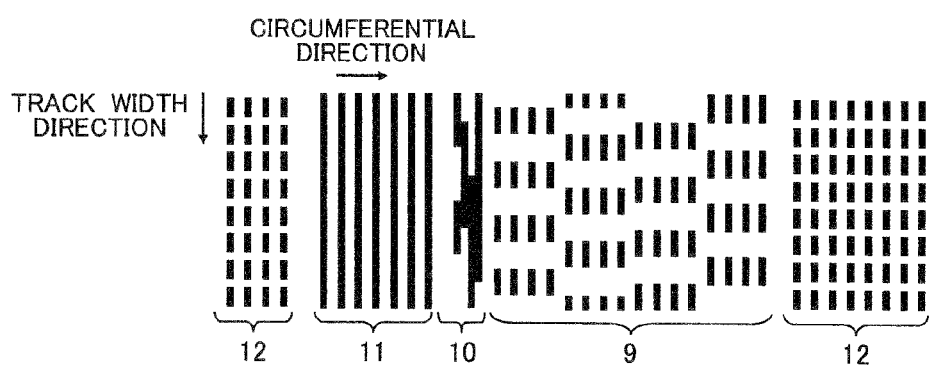

A pattern formed on patterned media will be described. The magnetic information currently written in patterned media can be roughly divided into two areas: a servo area (9 to 11) and a data area (12) as shown in FIGS. 2A and 2B. FIG. 2A shows a discrete track medium. FIG. 2B shows a pattern medium. The servo area mainly includes a preamplifier area 11 for adjusting the gain of a signal to obtain constant amplitude and for generating an accurate clock, a sector address area and track address area 10 for indicating the current position on a magnetic disk, and a burst signal area 9 used for positioning of a magnetic head. In both the discrete track medium and the pattern medium, magnetic information of each of the servo areas is formed by a magnetic material and a non-magnetic material. The data area of the discrete track medium is formed by embedding the non-magnetic material only between adjacent tracks. While in data area of the pattern medium, it is formed by embedding the non-magnetic material both between adjacent tracks and between adjacent bits.

In the discrete track media (patterned media), as shown in FIG. 1, each data track is separated by a gap 6 to prevent side-writing and cross-talk to adjacent tracks. As a result, the signal quality can be significantly increased. In the conventional media, a noise component is present in the boundary of adjacent data tracks, so that the signal recording state is unclear. However, no noise can principally occur in the discrete track media in which a magnetic layer that corresponds to the boundary of the data tracks is removed. As a result, the recording magnetization state is very clear. The higher the recording density of the discrete track media, the greater the difference of the SN ratio between the discrete track media and the conventional media. Thus, the advantage of the signal quality will increase.

A further advantage of the patterned media is that it is possible to form the servo pattern with a very high accuracy by a high-performance imaging technology. Based on the information of the formed servo area (pattern), it is possible to accurately move the magnetic head to a predetermined position in nm order. Several hundreds of servo areas are physically formed in the discrete track media.

Both in the discrete track media and the pattern media, the data area and the servo area are processed so that the magnetic film 5 to be the recording layer on the soft magnetic layer 8 has a concave-convex shape, in order to form the data and servo areas described above. An imprint lithography method is preferable for the process method from the point of view of mass production. The following is a method for producing patterned media by the imprint lithography method.

First, an imprint stamper having a concave-convex pattern opposite to the concave-convex pattern formed on a magnetic recording medium is produced by an electron beam lithography method and the like. Next, a resist is applied to the soft magnetic layer or the recording layer. The imprint stamper is pressed against the resist to transfer the concave-convex pattern formed on the surface of the imprint stamper. After the imprint stamper is removed, the resist is applied to the soft magnetic layer. In this case, a magnetic material is formed as the recording layer in an opening portion of the resist. When the resist is applied to the magnetic material to serve as the recording layer, the magnetic material is etched using the resist as a mask to form a non-magnetic material in the opening portion of the resist. In this way, a patterned medium with the desired magnetic pattern is produced.

As described above, the patterned media has the data area and the servo area, in which a profile waveform of the servo area that appears outstanding can be obtained by means of optical inspection. In this waveform, the wave peak value of the servo area greatly increases depending on the servo pattern. It has been found that it is difficult to recognize a defect in the servo pattern by the conventional method for setting a slice directly to the profile in order to detect the defect.

Thus, in this embodiment, a laser beam is irradiated onto a surface of a patterned medium rotating by a spindle stand or other means, and the reflected light is received. There are two typical methods of receiving the reflected light: one is a diffuse reflection method and the other is a specular reflection method.

Figure 3:
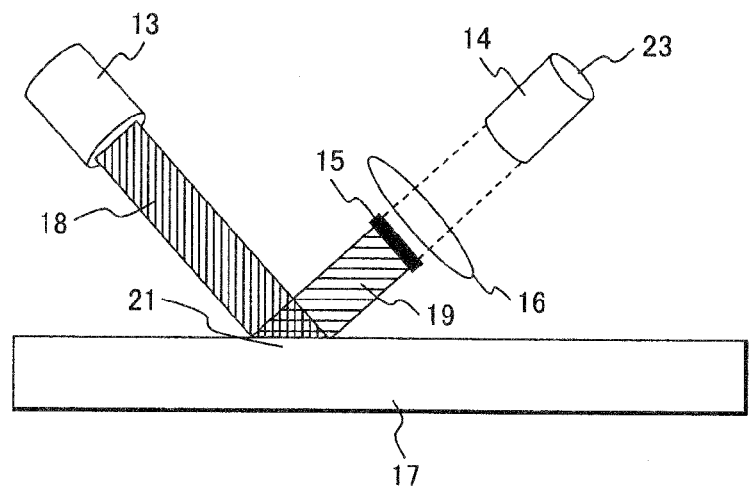
FIG. 3 is a schematic diagram of an optical inspection method (diffuse reflection method), showing an example of when no defect is present.
Figure 4:
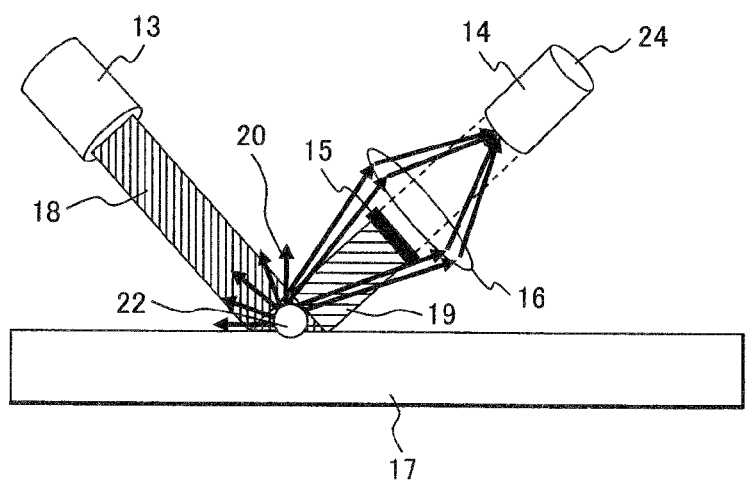
FIG. 4 is a schematic diagram of the optical inspection method (diffuse reflection method), showing an example of when a defect is present.

The diffuse reflection method is configured as shown in FIG. 3. That is, it blocks a specular light 19 from a medium 17, which is the reflected light of an illumination light 18 from a laser source 13, and receives only the diffuse light by a laser optical receiver 14. As shown in FIG. 3, when no defect is present in the medium 17 (21), no light is received by the laser optical receiver 14 (23). On the other hand, as shown in FIG. 4, when a foreign matter or defect is present or when the shape of the medium 17 changes (22), diffuse light 20 is received by the laser optical receiver 14 (24).

Figure 5:
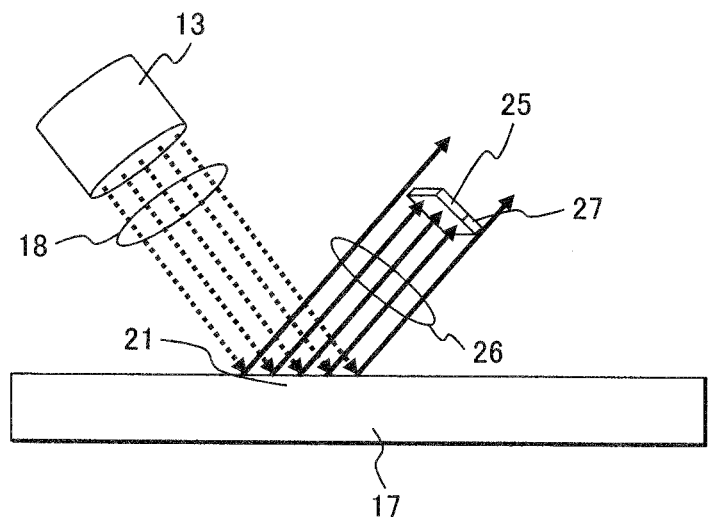
FIG. 5 is a schematic diagram of an optical inspection method (specular reflection method), showing an example of when no defect is present.
Figure 6:
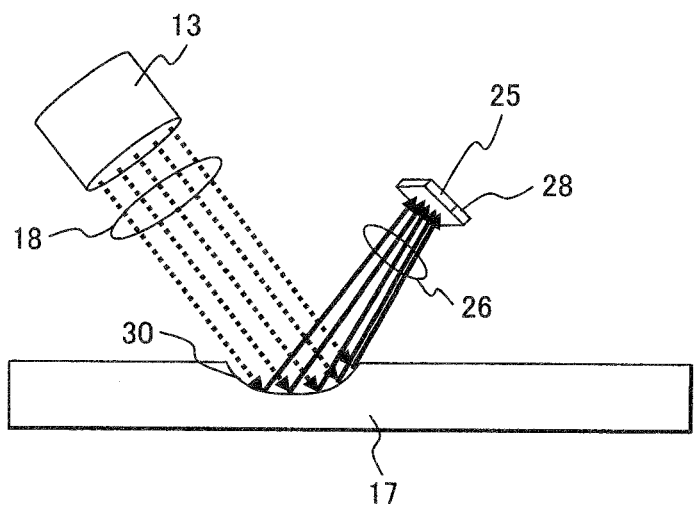
FIG. 6 is a schematic diagram of the optical inspection method (specular reflection method), showing an example of when a concave defect is present.
Figure 7:
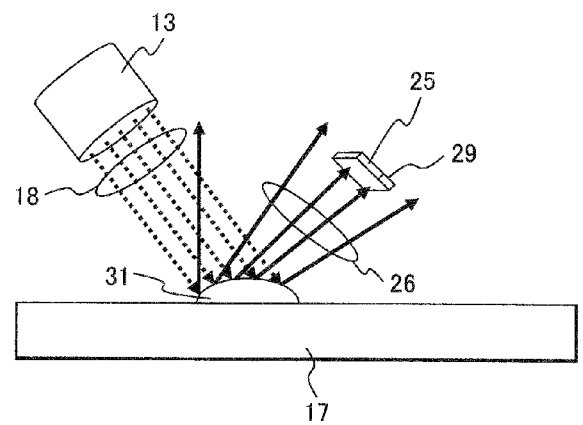
FIG. 7 is a schematic diagram of the optical inspection method (diffuse reflection method), showing an example of when a convex defect is present.

The specular reflection method is configured as shown in FIGS. 5, 6, 7. That is, it receives the increase and decrease of specular light 26 of the illumination light 18 from the laser source 13 by a specular reflection sensor 25. As shown in FIG. 5, when no defect is present in the medium 17 (21), the amount of received light is a specified amount (normal) (27). As shown in FIG. 6, when a concave defect is present or when the shape of the medium 17 changes in the concave direction (30), the amount of received light increases (28). As shown in FIG. 7, when a convex defect is present or when the shape of the medium 17 changes in the convex direction (31), the amount of received light decreases (29).

Figure 8:
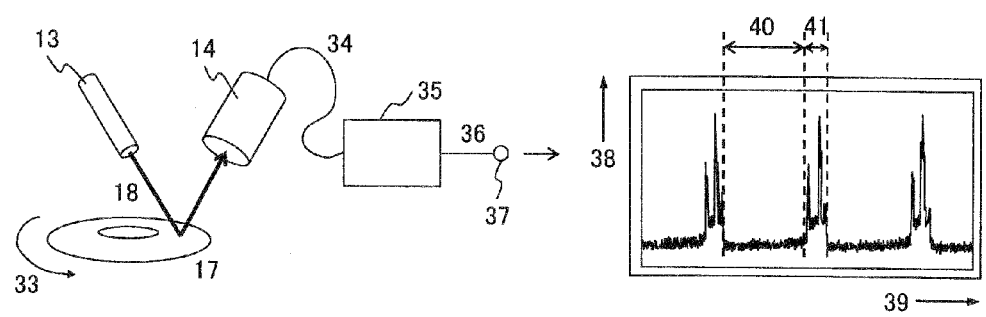
FIG. 8 is a diagram showing a method for obtaining a surface profile of a discrete track medium (DTM) in an optical inspection according to an embodiment.

In both the light receiving methods described above, as shown in FIG. 8, the intensity of the reflected light is converted to an analog electrical signal 34 by the laser optical receiver 14 and outputs the analog electrical signal 34. The analog electrical signal 34 is converted to a digital electrical signal 36 by an analog/digital (AD) converter 35. The obtained digital electrical signal 36 is sampled (37). Thus, a surface profile of the medium 17 is obtained. The waveforms of a data area 40 and a servo area 41 are as shown in FIG. 8. Here, reference numeral 39 denotes the circumferential direction of the medium 17.

Figure 9:
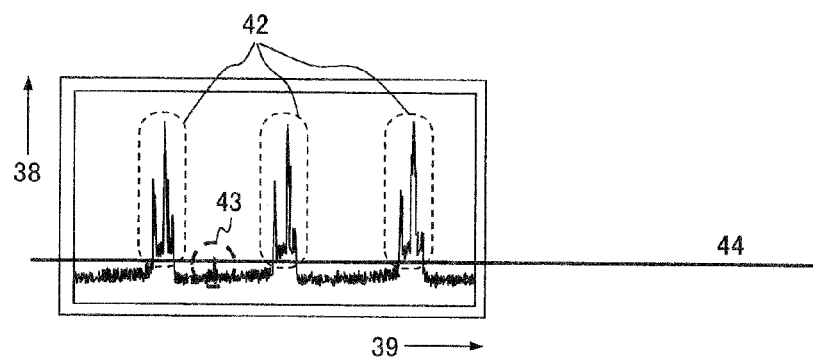
FIG. 9 is a diagram showing a method for detecting a defect in the data area of the DTM according to the embodiment.

Of the obtained profiles of the patterned medium, as shown in FIG. 9, an arbitrary slice 44 (slice for detecting defects in the data area) is set with respect to the data area, so that the wave value higher than the set slice 44 can be recognized as a defect 43. It is possible to detect only the defect of the data area, excluding a component 42 corresponding to a servo area profile that will be described below.

Figure 10:
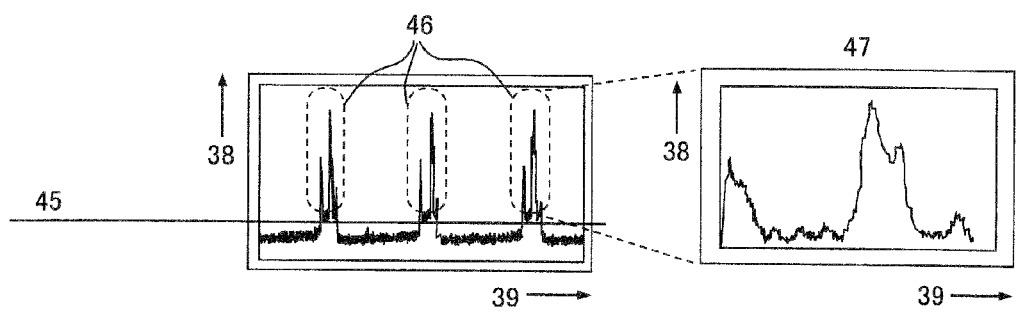
FIG. 10 is a diagram showing a method for obtaining a servo area profile according to the embodiment.

Further, as shown in FIG. 10, a slice 45 for detecting defects in the servo area is set in order to obtain a servo area profile 47. The accuracy in obtaining the servo area profile can be improved by, for example, adding a slice for detecting the width (time)/peak wave value of the servo area.

Figure 11:
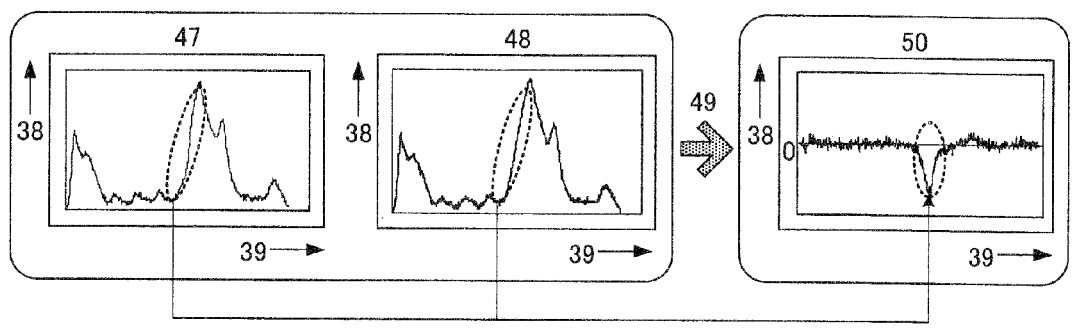
FIG. 11 is a diagram showing a differential waveform between the servo area profile and a master servo area profile according to the embodiment.

As shown in FIG. 11, inspection information (differential waveform) 50 is obtained from a difference 49 between the servo area profile obtained by the method described above and a master servo area profile described below. On the left side of FIG. 11, the slope of the portion indicated by the dotted line is different between the servo area profile 47 and a master servo area profile 48. This appears in the portion of the differential waveform 50 indicated by the dotted line. The difference can be calculated by synchronizing servo areas at the first point after passing the slice for detecting the servo area, or at the peak point.

Figure 12:
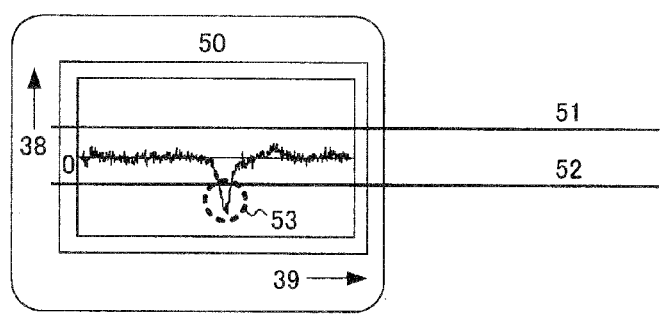
FIG. 12 is a diagram showing a method for detecting a defect from the differential waveform according to the embodiment.

In order to detect a defect, as shown in FIG. 12, slices 51, 52 for detecting defects in the servo area are set to the differential waveform 50. Here, a wave value exceeding the level of the set slice can be recognized as a defect 53. There is a possibility that the inspection information has a plus component and a minus component. In order to address this, two slices are set for detecting both plus and minus components, or one slice is set by converting the output to one absolute value.

The master servo area profile can be a profile obtained from the average value over plural servo areas, or a profile obtained from the average value over servo areas on one track or a profile obtained from the average value over servo areas of the same radius. The area of the same radius is an area of the sections of the medium divided, for example, an outer peripheral area, a middle peripheral area, and an inner peripheral area. As described above, the servo area of the pattern medium may be different in the physical shape and the circumferential length for each radius. The surface profile obtained as a result of optical inspection may also be different for each radius area. Thus, it is preferable that the master servo area profile for determining the profile difference is prepared for each area. Note that other profiles, such as those obtained from another medium or separately generated, can also be used for the master servo area profile.

As described above, the servo area is different in the physical shape and the circumferential size between the outer and inner peripheries of the medium. This is the structural characteristics of the medium so that the reading time of each servo area is identical with a constant rotation speed of the medium. For this reason, the servo area profile obtained by the optical inspection may be different depending on the position in the radius direction. In this case, it is necessary to prepare the master servo area profile used for determining defects in the servo area, for each area specified in the radius direction (such as the inner peripheral area, middle peripheral area, and outer peripheral area). For a more accurate inspection, it is necessary to specify more precisely the areas according to the structure of the medium. The master servo area profile of each area is determined by taking the average value of servo area profiles in the entire area, or the average value of sampled servo area profiles, and the like. Integration can be performed before taking the average value.

The pattern of the servo area is a series of patterns formed in the track direction and in the radius direction, with a difference of only several or tens of bits. Thus, in this embodiment, the average value in the track width direction is calculated with respect to the reflected light profiles obtained from the servo area. The result is set to the master servo area profile as the threshold. The abnormality of pattern is determined based on whether the threshold is higher than the wave peak value of the profile obtained from the inspected area. Even if there is a defect in a portion of the servo area, which is later averaged by integration, there is little influence on the average result.

With the above method, the profile difference is determined with respect to the servo area in which different patterns are formed in the radius direction, based on the master servo area profiles obtained for each track area. This ensures accurate determination of defects without being influenced by the difference of patterns. Each servo area has a series of patterns in the track direction with a difference of only several tens of bits between them. Such a difference is not detected by the optical laser, and has little influence on the average result of the profiles. Thus, it is possible to determine the threshold, which is constant without being easily influenced by the presence or absence of a defect in the master target area. As a result, the accuracy of the defect detection is increased. The averaging area, which is the base of the threshold, can be selected from one round of the track to be inspected, or plural rounds including the previous and next tracks in addition to the current track.

As described above, according to the embodiment of the present invention, it is possible to achieve the following effects. That is, inspection is fast because a laser with a predetermined spot diameter spirals over the entire surface of a patterned medium in which data and servo areas are formed. Further, even in the profile that changes depending on the shape and pattern of the servo area, it is possible to detect a defect by setting an appropriate master servo area profile for determining the profile difference. Furthermore, it is also possible to detect defects such as etching defects and formation defects, in addition to concave/convex defects in the servo area.

The present invention is particularly effective in inspecting the presence or absence of defects including surface roughness, process fluctuation, and adhesion of foreign matters in patterned media formed by applying imprint lithography techniques.

What is claimed is:

1. A method for detecting surface defects in patterned media comprising the steps of:
    irradiating a laser beam onto a surface of a rotating patterned medium;
    detecting reflected light from the surface of the patterned medium by an optical receiver, and converting the reflected light to an analog electrical signal;
    converting the analog electrical signal to a digital signal by an analog/digital converter;
    distinguishing between a data area and a servo area based on a profile obtained by sampling the digital signal;
    determining the presence or absence of a defect by a predetermined threshold with respect to the distinguished data area;
    obtaining a differential waveform by taking a difference between the profile of the distinguished data servo area and a master servo area profile prepared in advance with synchronizing a servo area at the first point after passing the slice for detecting the servo area or at the peak point; and
    determining the presence or absence of a defect based on a predetermined threshold with respect to the obtained differential waveform.

2. The method for detecting surface defects in patterned media according to claim 1, wherein the master servo area profile is a profile obtained from an average value over a plurality of servo areas of the patterned medium.

3. The method for detecting surface defects in patterned media according to claim 1, wherein the master servo area profile is a profile obtained from the average value over servo areas on one track of the pattern medium.

4. The method for detecting surface defects in patterned media according to claim 1, wherein the master servo area profile is a profile obtained from an average value over a plurality of servo areas, which is obtained by dividing the patterned medium into an outer peripheral area, a middle peripheral area, and an inner peripheral area.

5. The method for detecting surface defects in patterned media according to claim 1, wherein the reflected light from the surface of the patterned medium is diffuse light or specular light.

6. A method for processing patterned media comprising a first process for producing a patterned medium having a predetermined magnetic pattern, and a second process for detecting defects on a surface of the patterned medium produced by the first process,
wherein the second process includes the steps of:
irradiating a laser beam onto the surface of the rotating patterned medium;
detecting reflected light from the surface of the patterned medium by an optical receiver, and converting the detected light to an analog electrical signal;
converging the analog electrical signal to a digital signal by an analog/digital converter;
distinguishing between a data area and a servo area based on a profile obtained by sampling the digital signal;
obtaining a differential waveform by taking a difference between the profile of the distinguished data servo area and a master servo area profile prepared in advance with synchronizing a servo area at the first point after passing the slice for detecting the servo area or at the peak point; and
determining the presence or absence of a defect based on a predetermined threshold with respect to the obtained differential waveform.

7. The method for processing patterned media according to claim 6, wherein the master servo area profile is a profile obtained from an average value over a plurality of servo areas of the patterned medium.

8. The method for processing patterned media according to claim 6, wherein the master servo area profile is a profile obtained from an average value over servo areas on one track of the patterned medium.

9. The method for processing patterned media according to claim 6, wherein the master servo area profile is a profile obtained from an average value over a plurality of servo areas, which is obtained by dividing the patterned medium into an outer peripheral area, a middle peripheral area, and the inner peripheral area.

10. The method for processing patterned media according to claim 6, wherein the reflected light from the surface of the patterned medium is diffuse light or specular light.

11. The method for processing patterned media according to claim 6,
wherein the first process includes the steps of:
producing an imprint stamper having a concave-convex pattern opposite to a concave-convex pattern formed on a magnetic recording medium;
applying a resist onto a soft magnetic layer or a recording layer, and transferring the concave-convex pattern of the surface of the imprint stamper onto the resist by pressing the imprint stamper against the resist;
when the resist is applied onto the soft magnetic layer after the imprint stamper is removed, forming a magnetic material to be a recording layer in an opening portion of the resist; and
when the resist is applied onto the magnetic material to be the recording layer, forming a non-magnetic material in the opening portion of the resist by etching the magnetic material with the resist as a mask.

12. Patterned media produced by the process method according to claim 6.

13. Patterned media produced by the process method according to claim 11.

* * * * *